(12) United States Patent
Mathure et al.

(10) Patent No.: US 11,026,540 B2
(45) Date of Patent: Jun. 8, 2021

(54) SYSTEM WITH DRINKS PREPARATION MACHINE, A METHOD AND COMPUTER PROGRAM FOR ITS ACTIVATION

(71) Applicant: Qbo Coffee GmbH, Wallisellen (CH)

(72) Inventors: Gaurabh Mathure, Brooklyn, NY (US); Cesar Marchetti, New York, NY (US); Young Seo, New York, NY (US); Phil Robinson, Brooklyn, NY (US); Sophie Schwerdtfeger, Zurich (CH)

(73) Assignee: QBO COFFEE GMBH, Wallisellen (CH)

( * ) Notice: Subject to any disclaimer, the term of this patent is extended or adjusted under 35 U.S.C. 154(b) by 219 days.

(21) Appl. No.: 15/775,911

(22) PCT Filed: Nov. 14, 2016

(86) PCT No.: PCT/EP2016/077590
§ 371 (c)(1),
(2) Date: May 14, 2018

(87) PCT Pub. No.: WO2017/085018
PCT Pub. Date: May 26, 2017

(65) Prior Publication Data
US 2018/0325306 A1    Nov. 15, 2018

(30) Foreign Application Priority Data
Nov. 16, 2015 (EP) ..................................... 15194735

(51) Int. Cl.
*A47J 31/52* (2006.01)
*A47J 31/44* (2006.01)
(Continued)

(52) U.S. Cl.
CPC ............. *A47J 31/521* (2018.08); *A47J 31/40* (2013.01); *A47J 31/407* (2013.01); *A47J 31/44* (2013.01);
(Continued)

(58) Field of Classification Search
CPC ........ A47J 31/40; A47J 31/401; A47J 31/402; A47J 31/403; A47J 31/404; A47J 31/405; A47J 31/407; A47J 31/408
See application file for complete search history.

(56) References Cited

U.S. PATENT DOCUMENTS 5,074,341 A    12/1991  Credle, Jr. et al.
10,485,375 B2 * 11/2019 Wessels .................. A47J 43/27
(Continued)

FOREIGN PATENT DOCUMENTS

EP    2 155 023    3/2013
EP    2 801 304    11/2014
(Continued)

OTHER PUBLICATIONS

EP 2801304 A1—English Translation, acquired from ESPACE.net on Mar. 24, 2020 (Year: 2014).*
(Continued)

*Primary Examiner* — Jason L Vaughan
(74) *Attorney, Agent, or Firm* — Rankin, Hill & Clark LLP

(57) ABSTRACT

A method for operation of a drinks preparation machine serves for creating a total product from a first part-product and at least a second part-product and a third part-product. The method includes detecting a user input for specifying three quantity shares and creating a total product as a combination of the three part-products with quantities that correspond to the specified quantity shares. A graphic representation of the quantity shares is represented, each with
(Continued)

a share display per quantity share, wherein a size of the share display is essentially proportional to the respective quantity share, and the size of at least one of the share displays and thus of the respective quantity share can be adapted in accordance with a user input.

8 Claims, 6 Drawing Sheets

(51) Int. Cl.
    *A47J 31/40*         (2006.01)
    *G07F 13/06*        (2006.01)

(52) U.S. Cl.
    CPC ....... *A47J 31/4403* (2013.01); *A47J 31/4485* (2013.01); *A47J 31/4492* (2013.01); *G07F 13/065* (2013.01)

(56) References Cited

U.S. PATENT DOCUMENTS

| | | |
|---|---|---|
| 2011/0017776 A1 | 1/2011 | Metropulos et al. |
| 2011/0315711 A1 | 12/2011 | Hecht et al. |
| 2012/0035761 A1 | 2/2012 | Tilton et al. |
| 2013/0085599 A1 | 4/2013 | Nicol et al. |
| 2013/0129872 A1 | 5/2013 | Krüger |
| 2014/0040055 A1 | 2/2014 | Quartarone et al. |
| 2014/0081777 A1 | 3/2014 | Mastrodonato et al. |
| 2015/0351582 A1* | 12/2015 | Roth .................... B67D 1/0041 426/232 |

FOREIGN PATENT DOCUMENTS

| | | |
|---|---|---|
| EP | 3 031 748 | 6/2016 |
| EP | 3 031 749 | 6/2016 |
| GB | 2 451 508 | 2/2009 |
| JP | 2005-245498 | 9/2005 |
| JP | 2011-167394 | 9/2011 |
| WO | 01/12038 | 2/2001 |
| WO | 2007/003062 | 1/2007 |
| WO | 2007/011241 | 1/2007 |
| WO | 2009/032874 | 3/2009 |
| WO | 2009/032877 | 3/2009 |
| WO | 2009/032941 | 3/2009 |
| WO | 2010/066387 | 6/2010 |
| WO | 2011/046428 | 4/2011 |
| WO | 2011/163233 | 12/2011 |
| WO | 2015/016708 | 2/2015 |
| WO | WO-2015016708 A1 * | 2/2015 .......... A47J 31/4403 |

OTHER PUBLICATIONS

English translation of International Preliminary Report on Patentability dated May 22, 2018 (dated May 22, 2018), Application No. PCT/EP2016/077590, 5 pages.

\* cited by examiner

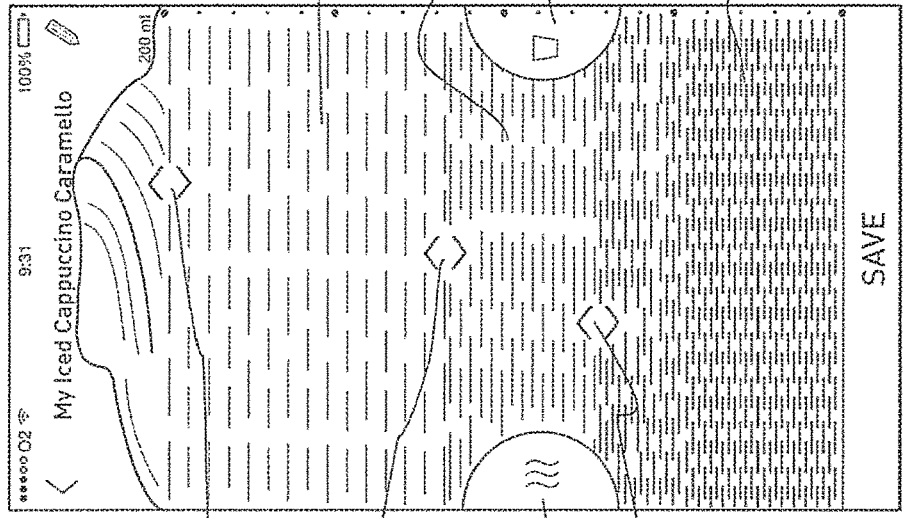

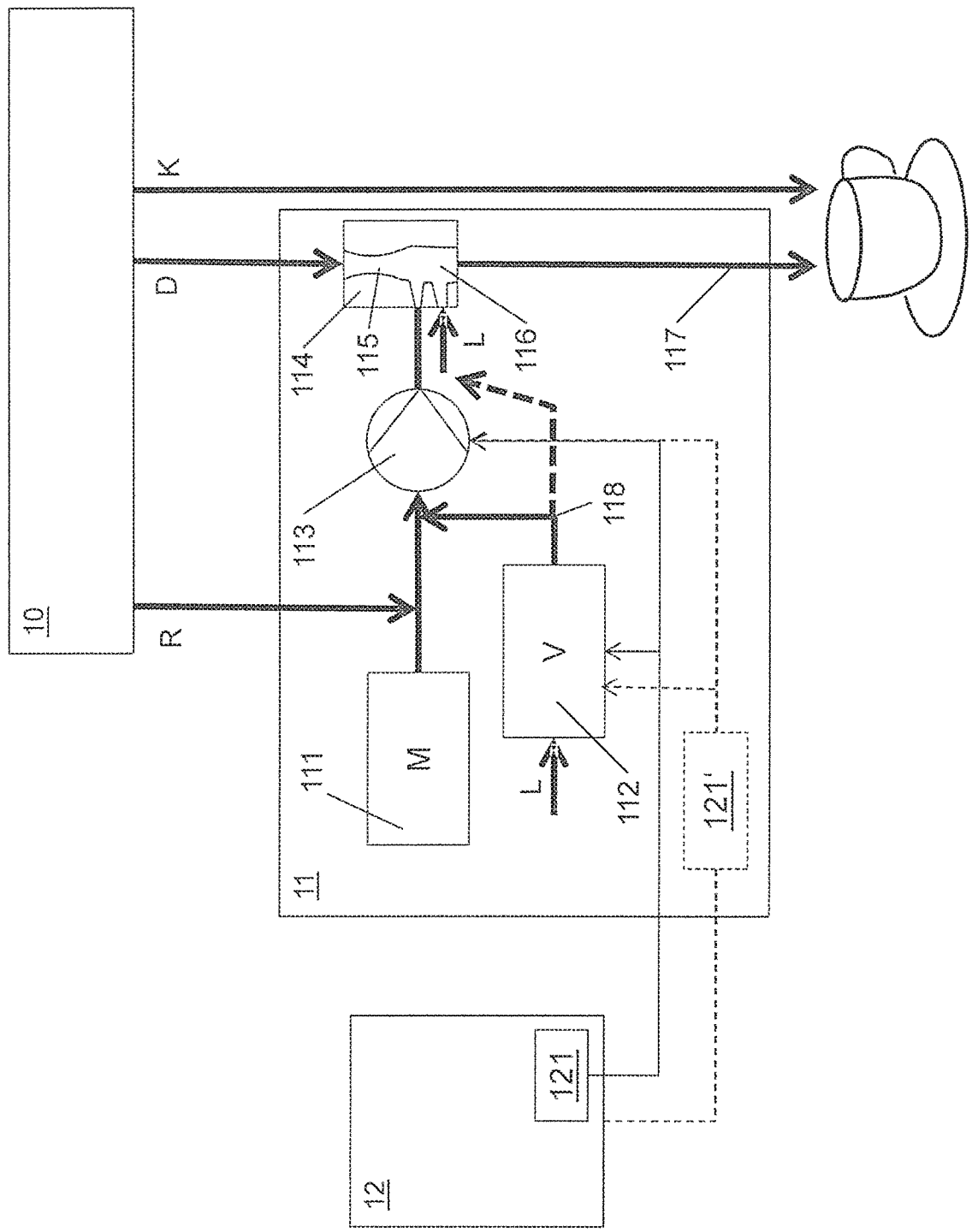

SYSTEM WITH DRINKS PREPARATION MACHINE, A METHOD AND COMPUTER PROGRAM FOR ITS ACTIVATION

BACKGROUND OF THE INVENTION

Field of the Invention

The invention relates to drinks preparation machines for preparing drinks or the like from a portion package with a portion packaging (for example capsule) and with an extraction material (for example coffee) that is contained in the portion packaging. It particularly relates to a system with a drinks preparation machine, to a method for its operation and to a computer program for its activation.

Description of the Related Art

Drinks preparation machines for preparing drinks or the like from an extraction material that is present in a portion package are known, for example, as coffee machines or espresso machines. In many corresponding systems, the portion packaging is designed as capsules, in which the extraction material is sealed, for example in an airtight manner. For extraction, the capsule is pierced, for example at two sides that are opposite to one another. An extraction fluid—generally hot water—is then introduced at the first side. The extraction product is discharged from the capsule at the second side. This takes place in a so-called brewing module.

Apart from a brewing module, one or more further units for delivering and adding a further drinks component such as milk for example can be present. The drinks preparation machine can therefore create a drink or generally speaking a total product from two part-products.

EP 2 155 023 B1 discloses a drinks preparation module with a graphic interface, on which a filling level symbol that represents a filling level of a vessel can be displaced by way of touching the graphic interface.

WO 2007/003062 A1 shows a hot drinks automat, concerning which a quantity of coffee and a quantity of milk can be adjusted at an operating unit by way of "+/−" key symbols, for preparing a milk coffee.

EP 2 801 304 shows the operation of a machine for preparing coffee with milk froth and optionally also milk. Quantity shares of coffee, water and milk froth (optionally also milk) are represented on a touchscreen in a symbolic image of a receptacle and can be adjusted by the user by way of displacing boundary lines between quantity shares.

WO 01/12038 shows a coffee machine that creates a liquid coffee extract as a reserve supply, in order therefrom to be able to quickly create different coffee variants when required. The characterisation of such variants is effected by way of displacing slide bars on a touchscreen. A "customisation director" can be realised in the coffee machine or on a remote appliance, for example on another customer appliance or on a PC or an on an external server. A user interface, which is connected to this, can be a computer, a PDA, a kiosk, a WAP device such as a mobile telephone, an automobile computer, an interactive television or an internet application etc.

WO2015/016708 shows a drinks preparation machine, concerning which the selection of two preparation parameters is effected by way of the selection of a point in a two-dimensional representation. The representation can be a pictorial representation of the effect of the selection. The first parameter relates for example to the relative shares of two components and the second parameter to the total quantity of these components or to a preparation type. Concerning further ingredients such as milk, quantity shares can be displayed and changed on a pictorial representation of a receptacle.

WO 2011/046428 shows a GUI with a touchscreen for specifying a drink. The type of drink and the ingredients are defined by pulling symbols from edge regions of the screen into an image of a cup. The definition can alternatively be effected by way of scrolling several simultaneously displayed parameters, or follow a graphically displaced decision tree.

US 2014/081777 shows the definition of a mixture of shares of a soft drink by way of a mobile appliance, its representation on a screen and the transfer of the mixture by way of a beverage identity token, for example a QR code.

WO 2009/032874 shows the definition of a drink with additions by way of a user, but without a graphically assisted input of quantity shares. Quantity shares are automatically adapted depending on how many ice cubes are added.

WO 2009/032941 likewise shows the definition of a drink with additions by a user, but without a graphically assisted input of quantity shares.

US 2012/035761 shows the definition of shares of ingredients by way of arrow keys and their representation in a pie chart.

SUMMARY OF THE INVENTION

A possible object of the invention is to provide a system with a drinks preparation machine, a method for the operation of a drinks preparation machine and a computer program for operating a drinks preparation machine, which permit a simplified operation.

A further possible object is to provide such a system, method and computer program, which permit the creation of a large variety of drinks variants.

The method for operation of a drinks preparation machine serves for creating a total product from a first part-product and at least a second part-product. It includes at least the following steps:
  detecting a user input for specifying a first quantity share and at least a second quantity share;
  creating the total product as a combination of a first part-product and of at least a second part-product, with a quantity of the first part product, which corresponds to the first quantity share, and with a quantity of the second part-product, which corresponds to the second quantity share.

A user can therefore set the quantity shares of the part-products to the total product, whereupon the drinks preparation machine automatically carries out the preparation. A combination of part-products, which, with regard to the quantity, can be specified by the user, can therefore be created without the user himself having to control the quantities, for example by way of monitoring the filling level of a receptacle or manually switching a valve or a pump on and off.

Herein, the total product additionally includes a third part-product, the user input specifies a third quantity share and the total product includes the combination with the third part-product according to the third quantity share.

A user can therefore set the quantity shares of the part-products to the total product, whereupon the drinks preparation machine automatically carries out the preparation. A combination of part-products which with regard to the quantity can be specified by the user can therefore be created without the user himself having to control the quantities, for example by way of monitoring the filling level of a receptacle and manually switching a valve or a pump on and off.

A very large variability of the total product can be realised thanks to be possibility of varying the shares of three part-products.

In the step of detecting the user input, a graphic representation of the quantity shares is represented, each with a share display per quantity share, wherein a size of the share display is essentially proportional to the respective quantity share, and the size of at least one of the share displays and thus of the respective quantity share can be adapted in accordance with a user input.

An intuitively and directly understandable and user-friendly input of the quantity shares is possible with this. The display can be effected on a screen or an extensive display element, but alternatively by a series of display elements such as for example colour-changing light diodes.

In the method, a quantity share can be transferred and processed as an absolute value (for example millilitres, pump running duration, pump delivery quantity per unit of time) or as a relative value with respect to a reference volume, for example to a total volume of a receptacle.

In an embodiment, the share displays are sections, adjacent to one another, of a linear representation of the shares on a touch-sensitive screen or touchscreen. Such a representation corresponds to stacked column diagram or bar chart.

In an embodiment, adjustment symbols are represented at boundaries between the sections, and the size of the share displays are adaptable by the user by way of displacing the adjustment symbols. As is generally known for the operation of touchscreens, a user with a finger or pen can touch the screen at the location where the adjustment symbol is represented, whereupon the adjustment symbol automatically follows a movement of the finger or pen at least along one dimension of the touchscreen, and on removing the finger or pen—at a possibly different location on the touchscreen—remains represented on the touchscreen at a position corresponding to this location. A respective quantity share is defined by this.

In an embodiment, boundaries between the sections are adaptable by way of that boundary which on contacting the screen (before the displacing) was closest to the location of contact, or whose distance to this location is smaller than a minimum distance, being displaced on displacing the finger or pen on the screen. In a related embodiment, both boundaries of that section, in which the location of contact lies, are displaced in accordance with the movement of the finger or pen. One can do without adjustment symbols in these embodiments.

In an embodiment, the share displays are part of a pictorial representation of shares of part-products to the total product, said shares being layered over one another. The share displays can each include a symbolic representation of the respective part-product whilst using colour and/or structure of the part-product.

An intuitively even more simply perceivable representation of the total product to be produced is possible with this, and accordingly a more efficient input of user wishes.

In an embodiment, the representation of the part-products is adapted in accordance with the part-products which are adjacent to one another, in the pictorial representation of the share displays in a region, in which share displays are adjacent one another.

In an embodiment, the representation of a part-product is adapted in accordance with the presence of a second part-product, in the pictorial representation of the share displays.

These two possibilities for the adaptation of the representation can be applied individually or in combination with one another. They permit a more natural representation of an ideal picture of the total product and herewith an intuitively simple operation.

In an embodiment, the share displays show a pictorial display of the shares in a pictorial representation of a receptacle.

In an embodiment, the first part-product is coffee and the second part-product milk or milk froth. In particular, the first part-product is coffee, the second part-product milk and the third part-product milk froth. It is not necessarily a temporal sequence of the creation of the part products which is meant by the designation "first" or "second" part-product, etc: for example the second part-product can be created and be dispensed into the receptacle before the first part-product. Moreover, two part-products can also be created and dispensed simultaneously.

In an embodiment, a sum of all quantity shares is limited to a total quantity on adapting one of the quantity shares. This can be effected for example by way of an adaption of the quantity shares towards greater shares not being possible once a total quantity is reached. In other words, none of the share displays can be displaced towards higher quantities. The user must reduce one of the other quantity shares before one of the quantity shares can be increased. The limitation can alternatively be effected by way of the quantity shares of one of the other quantity shares or of both of the other quantity shares being automatically reduced on increasing one the quantity shares, after reaching the total quantity. If both other quantity shares are reduced, then the two other quantity shares can be reduced proportionally to one another.

In an embodiment, the second part-product is milk and the third part-product is milk froth, and a second quantity share corresponding to a quantity of milk is limited to the bottom to a lower value, which is a function of the third quantity share, the third quantity share corresponding to a quantity of milk froth. The fact that as a rule a certain share of non-frothed milk arises on producing milk froth can be taken into account therewith. This share can be determined by way of experimentally determined functions which are carried out in the operating appliance or the control unit and which can optionally also be dependent on measurable parameters. For this reason, on the one hand a quantity share of milk can be set to a minimal value in accordance with the quantity of milk froth to be produced and accordingly also the associated share display represented. On the other hand, on producing the part-products milk and milk froth, one can take into account the fact that a share of milk already arises on producing the milk froth, and therefore the share of pure milk, which is to be delivered, can be reduced accordingly. For example, one can take into account the fact that milk with a volume share of 30% of the produced volume share of milk froth occurs on frothing.

In an embodiment, two of the quantity shares have a constant ratio to one another. For example, this applies to a second quantity share corresponding to a quantity of milk and to a third quantity share corresponding to a quantity of milk froth. On adapting one of these quantity shares, the other is likewise adapted according to the ratio. This can be useful if a milk frothing unit is designed to produce milk and milk froth only in this constant ratio.

In an embodiment, a first quantity share can only either assume the value zero or a value that lies above a minimum value of the first quantity share. In other words: the first quantity share cannot assume values that are larger than zero and smaller than the mentioned minimal value. Herein, in particular the first part-product—corresponding to the first quantity share—is coffee. Therewith, one takes into account the fact that a certain minimal quantity of hot water must always be pressed through the coffee capsule on preparing a (capsule) coffee. The mentioned limitation of the first quantity share therefore reflects the fact that either no coffee at all or then only a certain minimum quantity, for example 20 ml or more can be prepared. The same can also apply to other part-products. Hence, for example the frothing of only small quantities of milk is technically difficult and can be ruled out.

Maximum quantities for the individual quantity shares are likewise conceivable. For example, the water quantity, which is used for brewing a coffee capsule is limited to the top, in order to prevent an over-extraction, which is caused by too long a brewing time, and the corresponding compromise in taste. The maximum quantities of the quantity shares can also correspond to a holding capacity of storage receptacles such as e.g. a water tank or milk tank.

In an embodiment, the method as a further step comprises: detecting a user input for specifying a receptacle size or total quantity of the total product. Therewith, the method can be adapted to the size of different receptacles that are to be used, wherein the total quantity specified in this manner is used to limit the sum of the various quantity shares.

In an embodiment, the method as a further step includes: detecting a user input for specifying a temperature selection for at least one of the part-products.

In an embodiment, the method also includes the step of feeding milk and forming milk froth by way of a common supplementary unit, and optionally also heating the milk and/or the milk froth. With this, it is possible to form two further components for preparing a drink with only one supplementary unit and by way of this with relatively little effort.

A drink, in particular a coffee-based drink which includes a quantity ratio of milk and milk froth that can be adjusted by the user in a simple manner can therefore be produced in combination with the adjustment possibilities of the quantity shares of part-products, the possibilities having been described above.

The system with a drinks preparation machine for creating a total product from at least three-part products comprises:
  input means for detecting a user input for specifying a first quantity share and at least a second quantity share and a third quantity share;
  preparation units for creating the total product as a combination of a first part-product and of at least a second part-product and of a third part product, with a quantity of the first part product which corresponds to the first quantity share and with a quantity of the second part product which corresponds to the second quantity share and with a quantity of the third part product which corresponds to the third quantity share.

In an embodiment, the input means are part of the drinks preparation machine, for example an operating unit of this. No further appliance, which is separate from the drinks preparation machine and which is for detecting a user input, is therefore necessary.

In an embodiment, the input means are formed on an operating appliance, which is separate from the drinks preparation machine. The operating appliance includes an input device and an output device, which can be combined as a touchscreen, as well as a data processing unit and a communication unit for communication with the drinks preparation machine. The operating appliance can be a mobile, in particular a portable appliance, for example a mobile telephone or a smartphone, or a functionally equivalent appliance such as a smart watch or a wearable computer. The operating appliance can also be installed in a fixed manner, for example as part of a building or kitchen automation facility. Thanks to the operating appliance, operating elements, in particular the input device and the output device of the operating appliance and its programmability and computation power can be used for activating the drinks preparation machine.

The operating appliance is designed for carrying out at least a part of the described method. The operating appliance communicates with the drinks preparation machine via a communication connection. Herein, data that is representative of the receptacle selection or a total volume, absolute or relative quantity shares and optionally further parameters of part-products, such as for example temperature, sequence of the preparation of part-products, name of the drink, name of the user, preparation hints and recommendations and capsule preference are typically transmitted to the drinks preparation machine. Further data can be confirmation inputs that display to the system that the user has carried out a displayed user instruction. Initial values which are to be displayed and which concern the quantity shares, user instructions, etc. can be transmitted from the drinks preparation machine to the operating appliance.

The term "interface unit" is hereinafter used to indicate an operating unit of the drinks preparation machine as well as an operating appliance, which is separate from the drinks preparation machine. An interface unit can also be designed for a contact-free control, for example as a gesture control or a voice control.

In an embodiment, the system includes a supplementary unit, which is designed for feeding milk as the second part-product, optionally amid the heating of the milk, as well as for forming and feeding milk froth as the third part-product to the total product. Herein, a quantity share of milk froth can be specified. The supplementary unit can herewith be controlled to produce this specified quantity share (third quantity share) of milk froth, as well as a specified quantity (second quantity share) of milk.

In an embodiment, such a supplementary unit, hereinafter also called milk frothing unit, include a gear pump. The gear pump is connected at the inlet side to a milk feed conduit and to an air feed. Herein, an operating parameter can be adjusted depending on a measured value and/or a user input.

What is means here by "adjusting" is having an influence upon the at least one operating parameter of the milk frothing unit, said operating parameter influencing how this unit acts during an active milk frothing operation. The adjustability is therefore different from a mere "on/off", as is known from dockable milk frothing appliances according to the state of the art. The adjustability is effected in particular in a manner such that a parameter, which is specified by the user and/or a parameter that is specified by a control has an influence upon the characteristics and/or the quantity of the produced milk froth.

Amongst other things, the invention is based on the recognition that characteristics of the produced milk froth also depend on parameters, which cannot be known at all a priori. The inventor, in systematic trials, has ascertained that the temperature as well as the fat content as well as other properties of the milk has a decisive influence on the froth preparation.

An activation of the milk frothing unit, which sets the operating parameter in a manner depending on the user input and/or the measured value, can be present as part of the milk frothing appliance or can be arranged externally, in the drinks preparation machine.

A value which is measured directly at the milk itself, for example the milk temperature or the conductivity and/or another characteristic of the milk as such is/are considered as a measured value which influences the adjustment. Supplementarily or alternatively, a value determined in the drinks preparation machine can also be considered, for example a measurement result that serves for the recognition of an inserted drinks capsule in a capsule recognition module by means of a label or by means of colour and/or shape of the capsule.

A user input influencing the adjustment can be the direct input of the operating parameter, or also an input that indirectly influences the operating parameter, for example by way of the selection of a certain program via the drinks preparation machine (for example "dark latte macchiato", "light latte macchiato", "light cappuccino" or the like).

The adjustability of the milk frothing unit can be an adjustability of the gear pump speed, and this can be regulated, for example, depending on the nature of the gear pump or of an associated electric motor and thus be directly activated or merely influenced indirectly, for example via the pump power. In embodiments, the milk frothing unit at the outlet side of the gear pump includes a throttle, and such a throttle can be formed by way of a narrowing of the channel for the frothed milk. The interaction of the gear pump speed and the throttle will have a direct influence upon the compression of the air (milk as a liquid is incompressible, and other parameters influencing the frothing such as surface tension are constant), and thus also upon the characteristics of the small air bubbles in the froth.

Other parameters of the gear pump, for example a gear distance, can also be selected as the operating parameter.

Supplementarily or alternatively, the adjustability can also be or include an adjustability of the air feed. A valve unit, through which the air feed is effected, can have a variable active valve cross section (total cross section of the opening, through which air flows in) for this purpose. In an embodiment, a valve unit in particular includes a plurality of valve elements which can be opened or closed independently of one another. Different valve opening conditions can be created by way of this.

Such valve units can include a common valve chamber, from which the air flows in the direction of the gear pump.

As described, the valve unit can be arranged in the supplementary unit, or however in another part of the drinks preparation machine, in particular in the basic unit. In this case, the supplementary unit is supplied with an already adjusted variable airflow.

The computer program is envisaged for being implemented on an operating appliance for operating a drinks preparation machine for creating a total product from at least three part-products. On being implemented on the operating appliance, the computer program carries out the following steps:

representing a first quantity share and at least a second quantity share and a third quantity share, by way of displaying a graphic representation of the quantity shares, each with a share display per quantity share, on a screen of the operating appliance, wherein a size of the share display is essentially proportional to the respective quantity share;

detecting user inputs for adapting the size of at least one of the share displays; and adapting the size of this share display and thus of the respective quantity share in accordance with the user inputs;

transferring information that represents the user input and in particular the detected quantity shares, via a communication connection.

For detecting the user input, the representation of adaptable preparation parameters can firstly display stored initial values (or default values) which are then possibly adapted by the user.

In embodiments, further steps of the method described here are carried out on implementing the computer program.

The computer program for implementation on an operating appliance for operating a drinks preparation machine can be loaded into an internal memory of a digital data processing unit of the operating appliance and includes computer program code means, which, when they are implemented in the digital data processing unit of the operating appliance, bring this to carry out the steps of the method described above, the steps being envisaged for the operating appliance. A computer program product includes a data carrier, or a computer-readable medium, on which the computer program code means are stored.

BRIEF DESCRIPTION OF THE DRAWINGS

The subject-matter is hereinafter explained in more detail by way of preferred embodiment examples which are represented in the accompanying drawings. In each case are shown schematically in:

FIG. 2-8 exemplary displays on an interface unit for preparing a product, as well as elements of such displays; and FIG. 9 a supplementary unit as a milk frothing appliance.

DETAILED DESCRIPTION OF THE INVENTION

Figure 1:
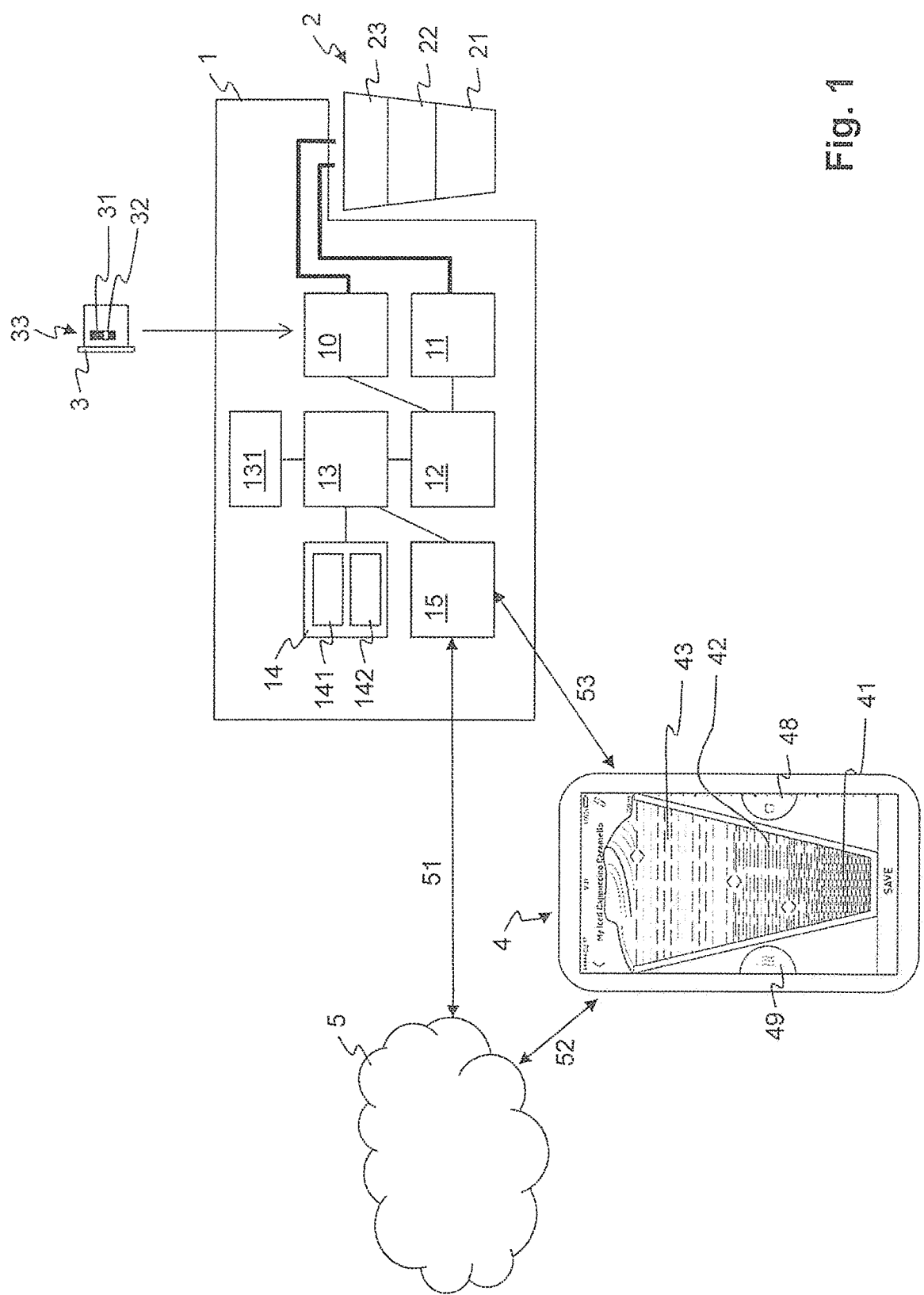
FIG. 1 a system for drinks preparation.

The reference numerals which are used in the drawings and their significance are listed in a grouped manner in the list of reference numerals. Basically, the same parts are provided with the same reference numerals in the figures.

FIG. 1 shows a system for drinks preparation with a drinks preparation machine 1 for filling a receptacle 2 with at least one extraction material from a portion package 3. The drinks preparation machine 1 can be connected to a communication network 5 such as an intranet or the internet via a first communication connection 51. An operating appliance 4 which can be mobile and portable, for example a mobile telephone or smartphone, or a dedicated appliance which is provided only for the operation of the drinks preparation machine 1 can communicate with the drinks preparation machine 1 in an indirect manner via a second communication connection 52 and the computer communication network 5 or directly via a third communication connection 53.

The drinks preparation machine 1 includes a basic unit 10 for extracting an extraction product by way of an extraction fluid. The drinks preparation machine 1 for example is a portion capsule coffee machine of the type known per se, wherein the basic unit 10 is a brewing module and the extraction fluid is hot water which is under pressure. The extraction product is fed to the receptacle 2.

The portion package 3 includes a portion packaging (for example capsule) and an extraction material (for example coffee) which is contained in the portion packaging.

The drinks preparation machine 1 includes a supplementary unit 11 which can deliver or produce at least one further product or part-product, for example milk or milk froth which is likewise fed to the receptacle 2. The supplementary unit 11 can include heating elements and/or cooling elements for heating or cooling the at least one further product.

The extraction product and the at least one part-product are fed to the receptacle 2 in a simultaneous or sequential manner and in the receptacle 2 together form a total product, for example a "Caffe Macchiato" consisting of coffee, cold or warm milk, and cold or warm milk froth. A total product is represented schematically as consisting of a first share 21, of a second share 22 and of a third share 23. In the receptacle 2, the shares can be layered above one another or mixed, depending on the preparation prescript. A "share" is to be understood as a volume share or a quantity share.

The drinks preparation machine 1 includes a control unit 12, a superordinate control unit 13, an operating unit 14 and a communication unit 15, for the operation by the user and for the optional communication with other appliances, for the control of the basic unit 10 and of the supplementary unit 11.

The control unit 12 is configured to activate the basic unit 10 and the supplementary unit 11, for example by way of it activating the pumps, valves, heating elements etc. of these units and detecting and processing measured values of temperatures, pressures, flow rate etc. The function of the control unit 12 can be realised by a single physical electronic unit, for example a microcontroller, or by several physical units or microcontrollers that are each assigned to the basic unit 10 and the supplementary unit 11 and communicate with one another via a communication bus or transmit individual analog or binary signals via signal leads.

The super-ordinate control unit 13 is configured to activate the operating unit 14 and the communication unit 15. The superordinate control unit 13 can be realised separately from the control unit 12, physically and/or with regard to the programming technology, or however together with the control unit 12 can form a single unit. In this context, the control unit 12 and the superordinate control unit 13 can be identical according to embodiments.

The operating unit 14 includes an input unit 141, for example with switches, keys and/or a jog dial or an adjusting wheel and/or a touch-sensitive surface, as well as an output unit 142 with optical display means such as lights or with a screen etc. and/or with acoustic display means such a loudspeaker, summer, etc.

The communication unit 15 is configured for communication via the first communication connection 51, which can be wireless (for example by way of Wi-Fi, Bluetooth, etc.) or wire-connected (for example by way of Ethernet, USB), in particular for communication with the communication network 5. Furthermore, the communication unit 15 can communicate with the operating appliance 4 in a wireless manner (for example by way of Wi-Fi, Bluetooth, NFC etc.) or in a manner connected by wire (for example by way of USB). The communication unit 15 can also be configured for reading out and writing a removable, portable data carrier, for example via a USB interface or SD card interface.

The operating appliance 4, typically a mobile telephone or smartphone, includes a user interface 44, for example a touch-sensitive screen or touchscreen which functions as an input and output unit. Additionally or alternatively, keys of the operating appliance 4 can also serve as input units. A voice input can be realised as an addition or alternative.

Where it is not mentioned otherwise, information can be issued to the user and inputs of the user can be inputted, via the operating unit 14 and/or the operating appliance 4. Thus, whenever interactions with the user are described in the present invention, it is to be understood that what is meant by this are outputs and/or inputs by way of the operating unit 14 and/or by way of the operating appliance 4. Generalised, these can therefore be described as the interface unit.

The superordinate control unit 13 includes a memory 131, in which, amongst other things, preparation prescripts or recipes are stored. A preparation prescript includes at least control information, which can be converted into commands for the control of the basic unit 10 and the supplementary unit 11. Such control information on the one hand includes sequence information that specifies a sequence of steps that are to be carried out by the basic unit 10 and/or the supplementary unit 11 for producing a total product. On the other hand, the control information includes for example temperatures, volume details, time details, etc.—hereinafter generally also called preparation parameters—which parameterise a sequence.

Sequence information for example represents "switch on the heating of the supplementary unit; switching on the pump of the brewing module for fifteen seconds; wait for at least five seconds after switching off the pump until the heating to the desired temperature; switch on the milk pump for twelve seconds". The times and temperatures that are mentioned in this example can be specified by preparation parameters and/or be determined by the control in accordance with other preparation parameters and measured values of sensors.

A preparation prescript can also include user instructions. These instructions are part of the preparation of the total product and must be carried out by a user. For this, the user instructions can be displayed by way of the output unit 142 or the user interface 44 of the operating appliance 4. For example, such user instructions are "now add ice cubes" or "please measure 20 ml caramel syrup" or "now add the prepared caramel syrup" or "please stir" or "please examine whether the inserted capsule and selected recipe match" etc. A user instruction can be accompanied by a visual representation, for example of the total product to be created, of a selected or actually inserted capsule etc.

For preparing a product, control information or corresponding commands are implemented by the basic unit 10 and the supplementary unit 11 in accordance with the preparation prescript and a preparation sequence is realised by this. If the preparation prescript includes user instructions, then these are displayed to the user at corresponding locations of the sequence. After an acknowledgement by the user by way of the input unit 141 or the user interface 44, said acknowledgement confirming the execution of the user instruction to the system, the subsequent control information of the preparation sequence is implemented.

A preparation prescript can include preparation parameters, which may be adapted by the user, as well as preparation parameters which cannot be adapted by the user. Adaptable preparation parameters, for example, are (volume) shares of part-products in the total product, a total quantity, or the temperature of a part-product. For adaptable preparation parameters, the preparation prescript can include a standard value or default value, which is used if the user does not adapt the parameter.

A selection of one or more such preparation parameters is displayed to the user on the operating unit 14 of the drinks preparation machine 1 or on the user interface 44 of the operating appliance 4, and an input of the use for adapting the preparation parameter is detected, for adapting adaptable preparations parameters. The input can be effected by way of actuating real buttons and/or virtual buttons such as keys or "buttons" in particular "arrow keys" and/or displaceable markings or "sliders" on a touchscreen of the operating unit 14 or of the operating appliance 4.

Basically, all types of parameters can be adapted in this manner. The adaption of shares of part-products of a total product is described hereinafter. According to the representation which is shown in FIG. 1, the input is effected by way of displacing markings, hereinafter called adjustment symbols 45, 46, 47, on a screen, in particular on a touchscreen of the operating appliance 4 or of the operating unit 14. Herein, the adjustment symbols 45, 46, 47 are represented on a symbolic representation of the total product with the part-products. Thereby, a receptacle 2 can be represented in cross section (as in FIG. 1) or the complete width of the screen can be filled out by a representation of the part-products (see FIG. 3).

This representation can be scaled such that the total quantity is always represented with the same size in the representation irrespective of the total quantity of the total product that is to be produced (ideally corresponding to the size or the volume of a selected receptacle 2). In this case, the representation only provides information on the relative shares of the part-products with regard to the total product.

This representation can alternatively be scaled such that the represented total quantity is represented proportionally to the total quantity of the total product that is to be produced. In this case, the representation provides information on the absolute quantity of the part-products and of the total product.

A mutual position of the adjustment symbols along a linear axis represents the share or the quantity or a filling level of part-products to the total product. A vertical layering of the part-products in the receptacle 2 is displayed in the shown example. Herein, a first share display 41 represents the share of a first part-product and this share can be adapted by the user on the touchscreen by way of displacing a first adjustment symbol 45. The first part-product for example is coffee. Analogously, a second share display 42 with a second adjustment symbol 46 and a third share display 43 with a third adjustment symbol represent milk and milk froth as further part-products. The adjustment symbols can be adapted by buttons in the case that no touchscreen is present.

Further elements for adapting preparation parameters are a receptacle selection symbol 48 and a temperature selection symbol 49. Given an activated receptacle selection symbol 48, for example after touching the receptacle selection symbol 48, a selection of receptacles with different volumes is displayed and a selection of the user is detectable. In an analogous manner, the selection of a temperature of one of the part-products, here milk, is detectable given an activated temperature selection symbol 49. Herein, a selection of discrete, defined temperatures or receptacle sizes is possible, and in other embodiments a stepless (infinite) selection.

The software for the display of the representation and for detecting the user inputs can limit the user inputs to physically and technically meaningful values. For example, if a portion package 3 is inserted, then a minimum quantity of coffee, for example 20 ml, according to the first share display 41 can be stipulated. The first adjustment symbol 45 therefore cannot be moved below a corresponding value. If the user attempts to do so despite this, then a notice can be displayed. Moreover, the third adjustment symbol 47 cannot be moved past an upper edge of a represented, selected receptacle. Or, if the increase of the quantity of one of the part products leads to the total quantity exceeding the volume of the selected receptacle 2, then either the further displacement of the respective adjustment symbol 45, 46, 47 can be prevented or the share of one of the other part-products can be automatically reduced, so that the total quantity is limited to the volume of the receptacle 2. Moreover, one can take into account the fact that on creating a certain part-product (for example milk froth) a certain quantity of another part-product (in this case milk) is also delivered.

The operating appliance 4 transmits information which represents the detected user inputs such as quantity shares, selection of the receptacle or total quantity, temperature selection etc. to the drinks preparation machine 1 in a direct manner via the third communication connection 53 or indirectly via the second communication connection 52 and the first communication connection 51.

FIGS. 2 to 7 shows a sequence of exemplary displays on the operating device 4 or generally on an interface unit, for preparing a product. FIG. 2 shows a selection screen for the selection of one of several preparation prescripts. After making a selection, an adaption screen for adapting the preparation parameters according to FIG. 3 is displayed. Its elements have already been explained in the context of FIG. 1.

Figure 4:
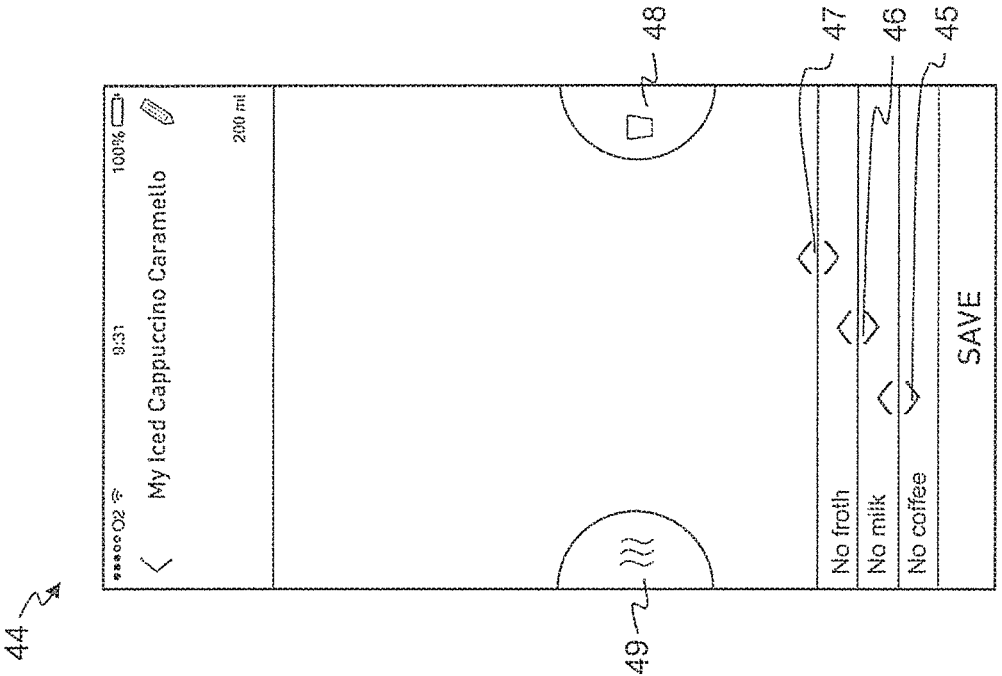
Figure 5:
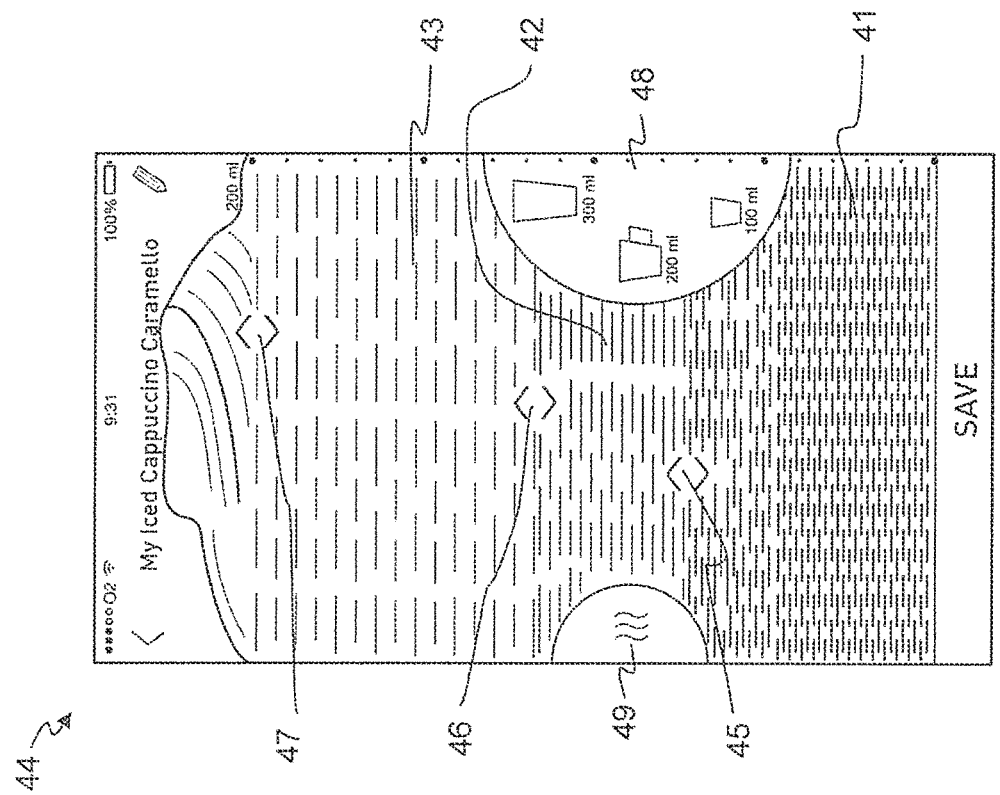

FIG. 4 shows the adaptation screen after an activation of the receptacle selection symbol 48: several receptacle symbols are shown, of which one can be selected. FIG. 5 shows the adaptation screen in a condition, in which all adjustment symbols 45, 46, 47 have been moved completely downwards to a minimal position corresponding to a share of zero. At least one of the adjustment symbols 45, 46, 47 would have to be displaced to a share which is different from zero for creating the total product.

Figure 6:
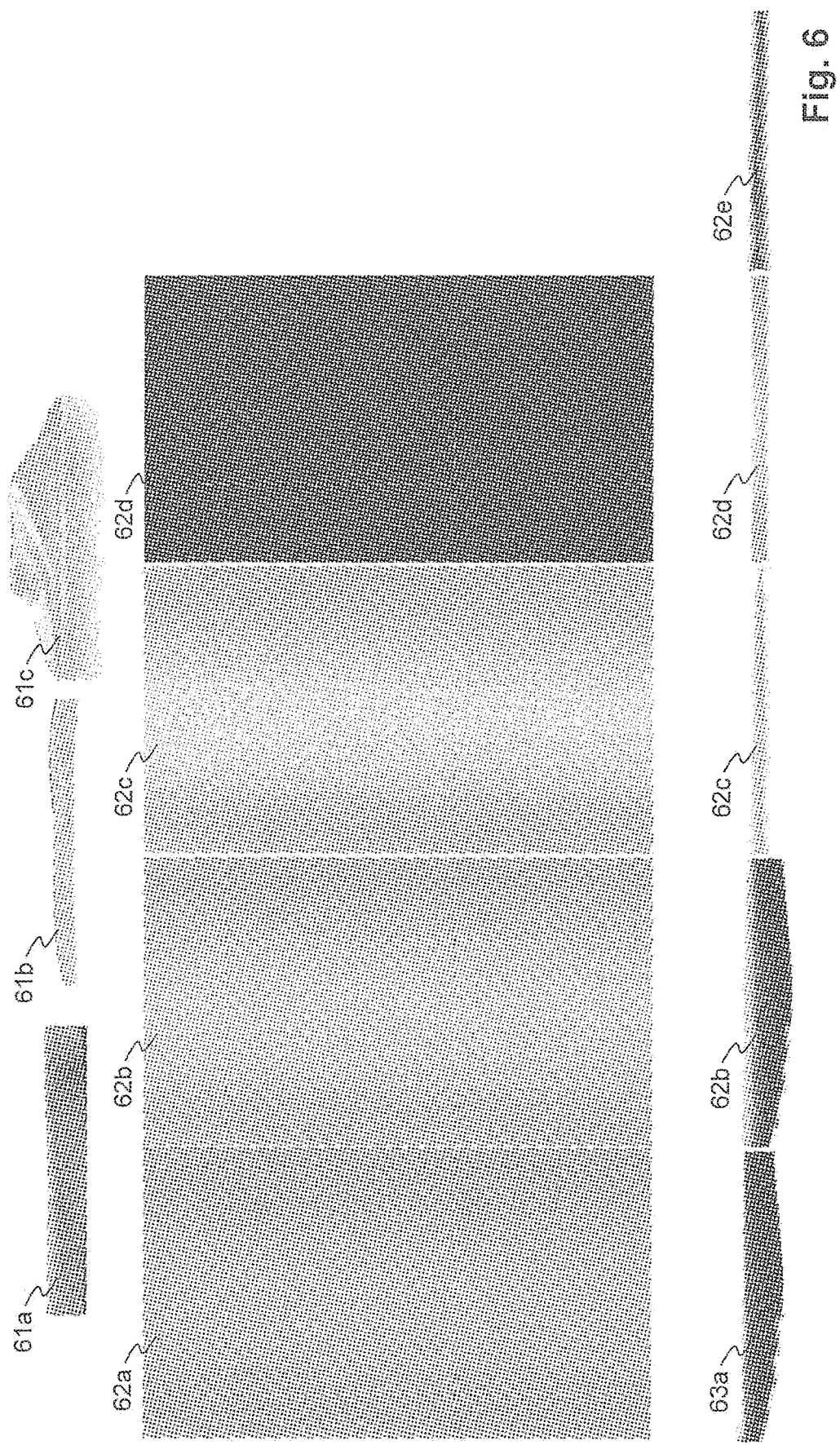

FIG. 6 shows elements of a pictorial representation of the share displays for regions, in which the share displays are adjacent to one another, and/or where the representation of a part product is adapted in accordance with the presence of a second part-product. Here, the part-products are coffee, milk and milk froth and the following elements are shown in the figure:

- variants 61 *a-c* of an uppermost completion, i.e. for completing the display at the upper edge of the display of the uppermost share: 61*a*—in case of coffee, 61*b*—in case of milk; 61*c*—in case of milk froth.
- variants 62*a-d* of share displays: 62*a*—milk, if coffee is present in the total product (coloured slightly brownish); 62*b*—milk, if no coffee is present in the total product (lighter than 62*a* and darker than 62*c*); 62*c*—milk froth; 62*d*—coffee.
- variants 63*a-e* of transitions, where share displays are adjacent to one another: 63*a*—transition between coffee and milk lying thereabove or a completion of coffee lying thereabove; 63*b*—transition between coffee and froth lying thereabove; 63*c*—transition between milk and froth lying thereabove, should coffee still be present in the total product (the lower part, corresponding to the milk is coloured slightly brownish); 63*d*—transition between milk and froth lying thereabove, if no coffee is present in the total product (the lower part, corresponding to the milk is lighter than at 63*c*);
63*e*—transition between milk and coffee lying thereabove (Latte Macchiato).

According to further, non-illustrated embodiments, the display is fashioned naturalistically in a further manner, for example by way of representing small bubbles in the milk froth, by way of wisps in the milk or coffee, by way of animating such bubbles or wisps or by way of slow, wavelike movements in the region of the transitions etc. According to other embodiments, the display is not naturalistic but abstract, with a uniform colour per share display and clear transitions between the share displays.

Figure 7:
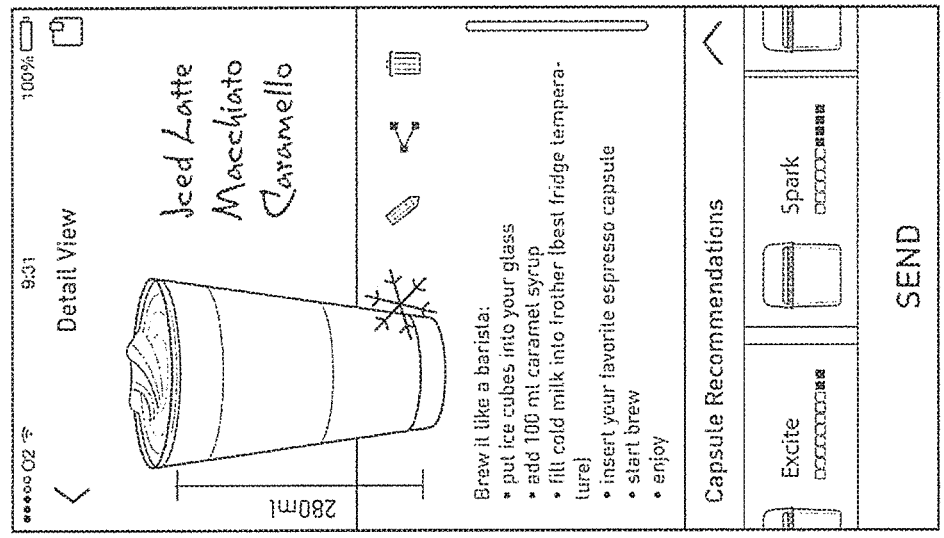
Figure 8:
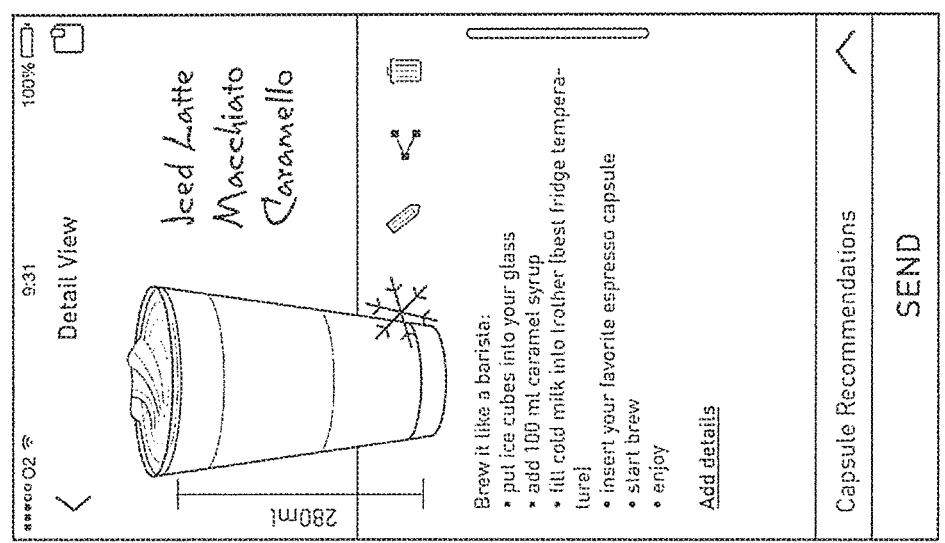

FIG. 7 shows a screen with user instructions which is represented subsequently to the adaptation of the preparation parameters. One of the steps which are to be carried out by the user is the selection of a coffee capsule. A key "capsule recommendations" can be activated for this when desired. If this is effected then one or more varieties of coffee capsules which are suitable for the initially selected preparation prescript, possibly whilst taking into account the preparation parameters, are displayed as shown in FIG. 8. The evaluation as to which variety of capsules is suitable can be effected by a defined assignment of capsule varieties to preparation prescripts. However, it can also be effected on the basis of the preparation parameters, in particular of the absolute and/or the relative quantity shares of the partproducts. Espresso capsules can be assigned in the simplest case, e.g. given a preparation prescript that sets a relatively small coffee quantity.

According to a further embodiment, a user can assign one or more certain capsule varieties to a preparation prescript according to his preference and store this assignment. This assigned capsule variety (varieties) can be displayed given a later selection of the preparation prescript. In a display according to FIG. 8, this can be effected by way of this capsule variety (varieties) being visually marked and highlighted, for example by way of an added symbol and/or by way of a differently coloured background or text. Moreover, if the user inserts a non-preferred capsule variety on executing a preparation prescript, to which such a preferred capsule variant is assigned, then a warning or further inquiry can be displayed.

The portion package 3 is provided with a machine-readable portion code 33. This can be realised by information carriers that are readable for example in an optical, mechanical or, via radio, wireless manner, or by a combination of two or more such information carriers. The portion code 33 represents a portion category 31 which specifies a category, to which the portion package 3 is assigned. Such categories can be different categories of drinks or products, such as "Espresso", "normal coffee", "filter coffee", "tea" and also "cleaning capsule". The portion code 33 moreover represents a portion identity 32, to which the portion package 3 is assigned. Such identities can represent certain individual products or varieties, such as "*Arabica* No. 42" or "Colombia special". Portion packages 3 with the same portion category 31 can have different portion identities 32. Portion packages 3 or corresponding products of a different identity can therefore be grouped into categories by way of the portion category 31.

The portion code 33 can be coded by way of a representation, which is redundantly coded several times, generally as an optical code, for example as a tenfold redundant optical code, for example a one-dimensional or two-dimensional barcode or a code as described in the European patent applications EP 14 197 487.3 of Nov. 12, 2014 and EP 14 197 488.1 of Nov. 12, 2014. In an embodiment, the portion code 33 includes sixteen bits, of which six serve as test bits, four for coding the portion category 31 and six for coding the portion identity 32.

An assignment of the portion code 33 or of portion categories 31 and/or portion identities 32, in each case to recommended or allowable ranges for preparation parameters can be stored in the drinks preparation machine 1. With this, after inserting a portion package 3 and on the basis of the portion code 33, one can automatically examine whether the portion package 3 is compatible with the quantity shares which are set by the user. If this is not the case, then a warning can be displayed and/or the further processing of the portion package 3 can be stopped. Alternatively, a positive notice can also be generated if the selected capsule is particularly well suited for the selected quantity shares. For example, an espresso capsule is not optimally suited should a coffee quantity that is envisaged for a normal coffee be selected by the user. Also a cleaning capsule or a tea capsule is basically not suitable if the preparation of a drink with milk has been selected.

FIG. 9 shows an overview sketch of a supplementary unit 11 which is designed as a milk frothing device for delivery or preparing milk as well as milk froth, as well as selected connections of the supplementary unit 11 to other units of the drinks preparation machine 1. "L" indicates air feeds in the figure. The letter D indicates a conduit for steam, K a conduit for the hot drink, R a conduit for cleaning water or steam (optional).

An activation 121 of the supplementary unit 11 is herein represented as part of the control unit 12 of the drinks preparation machine 1. Alternatively, a local activation 121' can also be present completely or partly as part of the milk frothing device or of the supplementary unit 11. This alternative is represented dashed in the figure.

Further elements of the milk frothing device are: a milk receptacle 111, a valve unit 112, a gear pump 113 and a mixing nozzle 114. The activation 121 is designed such that it can activate the gear pump 113 as well as the valve unit 112, wherein an operating parameter of the gear pump and/or the valve unit can be closed-loop controlled. Such operating parameters which can be regulated (closed-loop controlled) are for example the speed of the gear pump or an activate valve cross section of the valve unit. The valve unit 112 can also be arranged in another part of the drinks preparation machine 1, for example in the basic unit 10.

The gear pump 113 is connected at the inlet side to a milk feed conduit from the milk receptacle 111 and to an air feed from the valve unit 112. The valve unit 112 has an active valve cross section which is variable in steps or infinitely. For example, the valve unit 112 includes a plurality of valve elements, which can be opened or closed independently of one another. Milk or milk froth, which is delivered by the gear pump 113, gets into the mixing nozzle 114 where it can be mixed with air and/or steam, and via a milk froth outlet 117 into a receptacle 2.

Steam, which can be fed in via the steam connection D, gets into a mixing nozzle chamber 116 via a valve (not represented) and via a narrowing 115. A vacuum, by way of which milk and optionally air can be sucked via suitable feed conduits, is produced in the mixing nozzle chamber 116 by the flow of steam. The feed conduits, in particular for air, can be provided with valves, for example duck bill valves. Milk froth, which flows away via the milk froth outlet 117, arises in the mixing nozzle chamber 116. The frothed milk is warm due to the condensation heat that is dissipated from the steam.

The milk nozzle is therefore designed such that a vacuum is produced by the nozzle effect, on account a small nozzle opening, through which the steam exits through the narrowing 115 at a high speed. This assists the delivery of the milk out of the milk conduit even when the milk is actively delivered due to the gear pump.

The milk frothing device can be operated as follows:

The gear pump 113 is set into motion whilst at least one valve element of the valve unit 112 is opened, for preparing cold, frothed milk. A vacuum is produced at the inlet side of the gear pump 113 due to the effect of this, and this vacuum sucks milk from the milk receptacle 111 as well as air through the valve unit 112. Milk froth therefore arises in the gear pump and is delivered through the milk nozzle 114 and subsequently through the milk froth outlet 117 into the receptacle 2.

The sucking of the—generally cold—milk from the milk receptacle 3 via the gear pump 113 is also effected for the preparation of warm frothed milk. This gear pump delivers milk into the mixing nozzle 114. Steam is simultaneously fed from the basic unit 10 (coffee machine) to this mixing nozzle via the steam connection D. As explained above, the steam produces a vacuum which on the one hand exerts an additional suction effect upon the milk and assists the delivery through the gear pump 113 and on the other hand sucks air through the valve element 112, which is likewise at least partly opened. The milk is mixed with the steam in the mixing nozzle chamber 116, the steam heating this milk and air is simultaneously mixed in, so that air bubbles form and milk froth arises. The warm, frothed milk is delivered through the milk froth outlet 117.

In an embodiment, a 3/2 way valve 118 or another means can selectively connect the valve element 112 to the gear pump 113 or to the mixing nozzle chamber 116 (dashed conduit for air) for the production of the cold or warm milk froth. It is also possible for the air feed into the mixing nozzle chamber to be effected in a direct manner and not via the valve element 112, in which case the air feed cannot be regulated by a separate means on producing warm milk froth.

One can envisage the supplementary unit 11 also being able to merely deliver cold milk. In this case, the gear pump 113 is driven but the valve elements remain closed, and also no steam is fed.

One can further envisage the supplementary unit 11 being able to prepare warm milk. In this case, the valve element, through which air—directly or through the valve element 112—can get into the mixing nozzle, is closed. Moreover, on providing a separate valve for the mixing nozzle chamber (differing from the embodiment example which is represented in the figures), there exist the possibility of designing the respective valve in a closable manner. A closing of the valve for example can also be envisaged mechanically by hand by the user. For preparing warm milk, the milk is delivered out of the milk receptacle 3 by the gear pump 113 and steam is simultaneously fed in the mixing nozzle 114 without air also being fed. Warm milk, which is then delivered via the milk froth outlet 117, arises by way of the mixing of the cold milk with the steam.

The invention claimed is:

1. A method for operation of a drinks preparation machine, for producing a total product from a plurality of part-products, the plurality of part-products comprising a first part-product, a second part-product, and a third part-product, the method comprising:
    detecting a user input for specifying a plurality of quantity shares comprising a first quantity share, a second quantity share, and a third quantity share, wherein a graphic representation of each of the plurality of quantity shares is represented, with a plurality of share displays, each of the share displays being associated with one of the plurality of quantity shares, wherein for each of the plurality of share displays, a size of the respective share display represents the associated quantity share, and the size of at least one of the plurality of share displays and thus of the associated quantity share is adjusted according to the user input;
    producing the total product as a combination of part-products of the plurality of part-products, comprising the first part-product, the second part-product, and the third part-product, wherein a quantity of the first part-product corresponds to the first quantity share, a quantity of the second part-product corresponds to the second quantity share, and a quantity of the third part-product corresponds to the third quantity share;
    wherein the second part-product is milk, and the third part-product is milk froth, and the second quantity share corresponding to a quantity of the milk is limited by a minimum value which is a function of the third quantity share, the third quantity share corresponds to a quantity of the milk froth.

2. The method according to claim 1, wherein the share displays are sections, adjacent to one another, of a linear representation of the associated quantity shares on a touch-sensitive screen, and the size of the share displays is adapted by the user by way of manipulating the representation by way of contacting the touch-sensitive screen.

3. The method according to claim 2, wherein adjustment symbols are represented at boundaries between the sections, and the size of the share displays is adapted by the user by way of displacing the adjustment symbols.

4. The method according to claim 2, wherein the share displays are components of a pictorial representation of parts of the total product constituted by the part-products, said parts being layered over one another.

5. The method according to claim 1, wherein on adapting one of the quantity shares, a sum of the quantity shares is limited by a maximum value referred to as a total quantity of the total product.

6. The method according to claim 1, wherein the first quantity share can only either assume a value of zero or a value which lies above a minimum value of the first quantity share, wherein the first part-product is coffee.

7. The method according to claim 1, comprising the further step of:
    detecting a further user input for specification of a receptacle size or of a total quantity of the total product.

8. The method according to claim 1, with the step:
    detecting a further user input for specification of a temperature selection for at least one of the part-products.

* * * * *